United States Patent
Pitt

(10) Patent No.: US 7,637,454 B2
(45) Date of Patent: Dec. 29, 2009

(54) APPARATUS AND METHOD FOR CONTROLLING TWIST OF A WING OF AN AIRBORNE MOBILE PLATFORM

(75) Inventor: Dale M Pitt, St. Louis, MO (US)

(73) Assignee: The Boeing Company, Chicago, IL (US)

(*) Notice: Subject to any disclaimer, the term of this patent is extended or adjusted under 35 U.S.C. 154(b) by 318 days.

(21) Appl. No.: 11/447,760

(22) Filed: Jun. 6, 2006

(65) Prior Publication Data
US 2009/0261205 A1    Oct. 22, 2009

(51) Int. Cl.
*B64C 3/52* (2006.01)
*B64C 3/18* (2006.01)

(52) U.S. Cl. .................................. 244/48; 244/123.8
(58) Field of Classification Search ................ 244/38, 244/48, 49, 123.8, 123.9
See application file for complete search history.

(56) References Cited

U.S. PATENT DOCUMENTS

| | | | |
|---|---|---|---|
| 821,393 A * | 5/1906 | Wright et al. | ................. 244/16 |
| 3,599,904 A * | 8/1971 | Condit et al. | ................. 244/38 |
| 4,330,100 A | 5/1982 | Elber | |
| 5,681,014 A * | 10/1997 | Palmer | ................. 244/219 |
| 5,807,207 A | 9/1998 | Hisano et al. | |
| 6,000,660 A | 12/1999 | Griffin et al. | |

OTHER PUBLICATIONS

Pitt, Dale M. American Institute of Aeronautics and Astronautics. "Static and Dynamic Aeroelastic Analysis of Structural Wing Fold Hinges That are Employed as an Aeroelastic Tailoring Tool," undated, 11 pages.
Pitt, Dale M. "The Use of Structural Wing Fold Hinges as an Aeroelastic Tailoring Tool," undated, 12 pages.

* cited by examiner

*Primary Examiner*—Rob Swiatek
(74) *Attorney, Agent, or Firm*—Harness, Dickey & Pierce, P.L.C.

(57) ABSTRACT

An airborne mobile platform may have a wing having a length and a chord wise dimension, and a plurality of elongated structural components extending span-wise along the length of the wing. The elongated structural components may each have a localized hinge area. A device may be used for manipulating the elongated structural component to position the localized hinge area to selectively change a hinge line of the wing in response to an airflow over the wing.

20 Claims, 6 Drawing Sheets

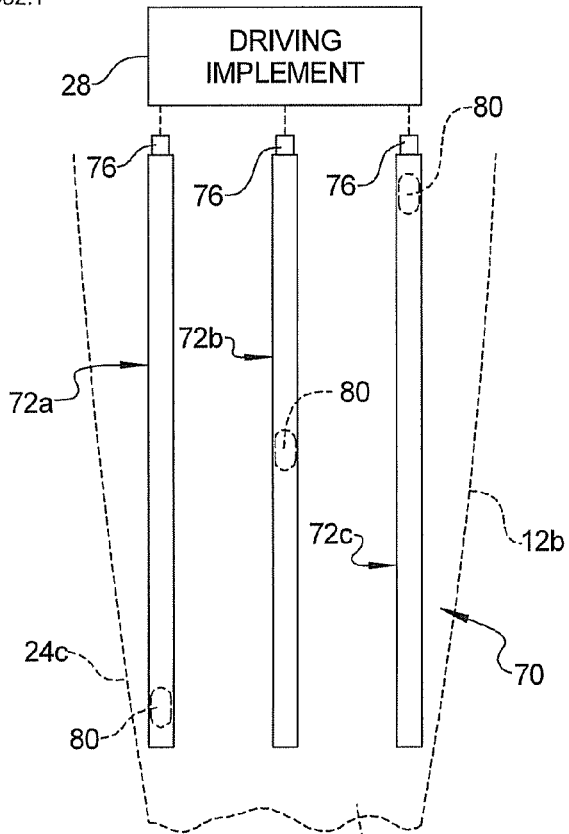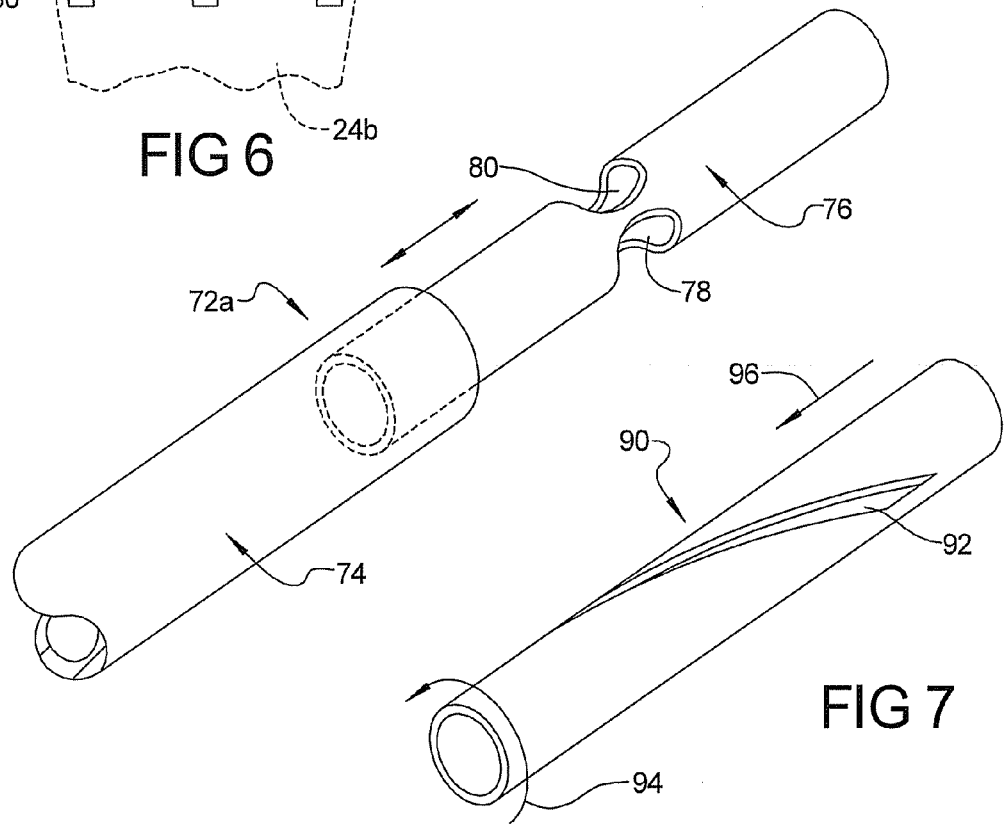

1

APPARATUS AND METHOD FOR CONTROLLING TWIST OF A WING OF AN AIRBORNE MOBILE PLATFORM

FIELD

The present disclosure generally relates to airborne mobile platforms, and more particularly to controlling the cord-wise stiffness of the wings on a mobile platform in a manner that allows the natural aerodynamic bending forces experienced by the wings during flight to twist the wings as needed in a controlled fashion, to assist in controlling flight of the mobile platform.

BACKGROUND

Aircraft designers are tasked with developing efficient technologies for controlling an aircraft flight path. In the earliest years of aviation, the Wright brothers used mechanical wires to twist the wing for aircraft roll control. Traditionally, aircraft have used moveable flap-like control surfaces (ailerons) to roll the aircraft or adjust the aircraft attitude. Recently, aircraft designers have started to devise ways of controlling and using aircraft aero-elastic wing twisting for roll control. This has involved using such components as a torque tube disposed in each wing, and running substantially the full span-wise length of the wings, to assist in twisting the wings to help provide flight control maneuvering for the aircraft. Such systems, however, have often required large, heavy and expensive motors to provide the necessary twisting force to the torque tube.

Accordingly, it would be highly advantageous to provide some means for controllably twisting a wing to assist in controlling flight of an aircraft, but without the large, heavy and expensive wing twisting structures that have previously been attempted.

SUMMARY

The present disclosure relates to an airborne mobile platform that may comprise a wing having a length and a chord wise dimension, and a plurality of elongated structural components extending span-wise along the length of the wing. Each elongated structural component may have a localized hinge area. A device may be used for manipulating the elongated structural components to position the localized hinge area to selectively change a hinge line of the wing in response to an airflow over the wing.

In another aspect the present disclosure may comprise a wing, where the wing includes a plurality of elongated structural components extending span-wise along the wing. The elongated structural components may each have a localized hinge area. A subsystem may be used for manipulating the elongated structural components to selectively position the localized hinge area to controllably position a hinge line of the wing, and without imparting a twisting force to the wing.

In still another aspect the present disclosure may comprise a method for controllably positioning a hinge line on a wing of a mobile platform that includes providing a plurality of structural components extending span-wise within the wing. A localized hinge area may be formed in each structural component. Each structural component may be controlled to position the localized hinge area within the wing so as to controllably vary the position of a hinge line of the wing.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a simplified diagrammatic plan view of the wing of FIG. 2 illustrating the orientation of the hinge line formed when the structural components are positioned as shown in FIG. 2;

FIG. 2B is an end view of the wing of FIG. 2A illustrating the upward twisting of the leading edge of the wing at the wing tip as a result of the orientation of the hinge line in FIG. 2A;

FIG. 2C is a perspective view of one of the structural components shown in FIG. 2 better illustrating the angular orientation of the cutouts formed on the structural component.

FIG. 3A is a simplified plan view of the wing of FIG. 3 illustrating the orientation of the hinge line formed by the positioning of the cutouts in the structural components shown in FIG. 3;

FIG. 3B is an end view of the wing of FIG. 3A illustrating the downward twisting at the tip of the wing as a result of the orientation of the hinge line shown in FIG. 3A;

FIG. 6 is a simplified, diagrammatic plan view of a wing incorporating telescoping tubular structural components;

FIG. 6A is a simplified perspective view of a portion of one of the telescoping tubular structural components shown in FIG. 6; and FIG. 7 is a perspective view of a structural component that makes use of a spiral cut-out to form a localized hinge area.

DETAILED DESCRIPTION

The following description of the various preferred embodiment(s) is merely exemplary in nature and is in no way intended to limit the present disclosure, its application, or uses.

Figure 1:
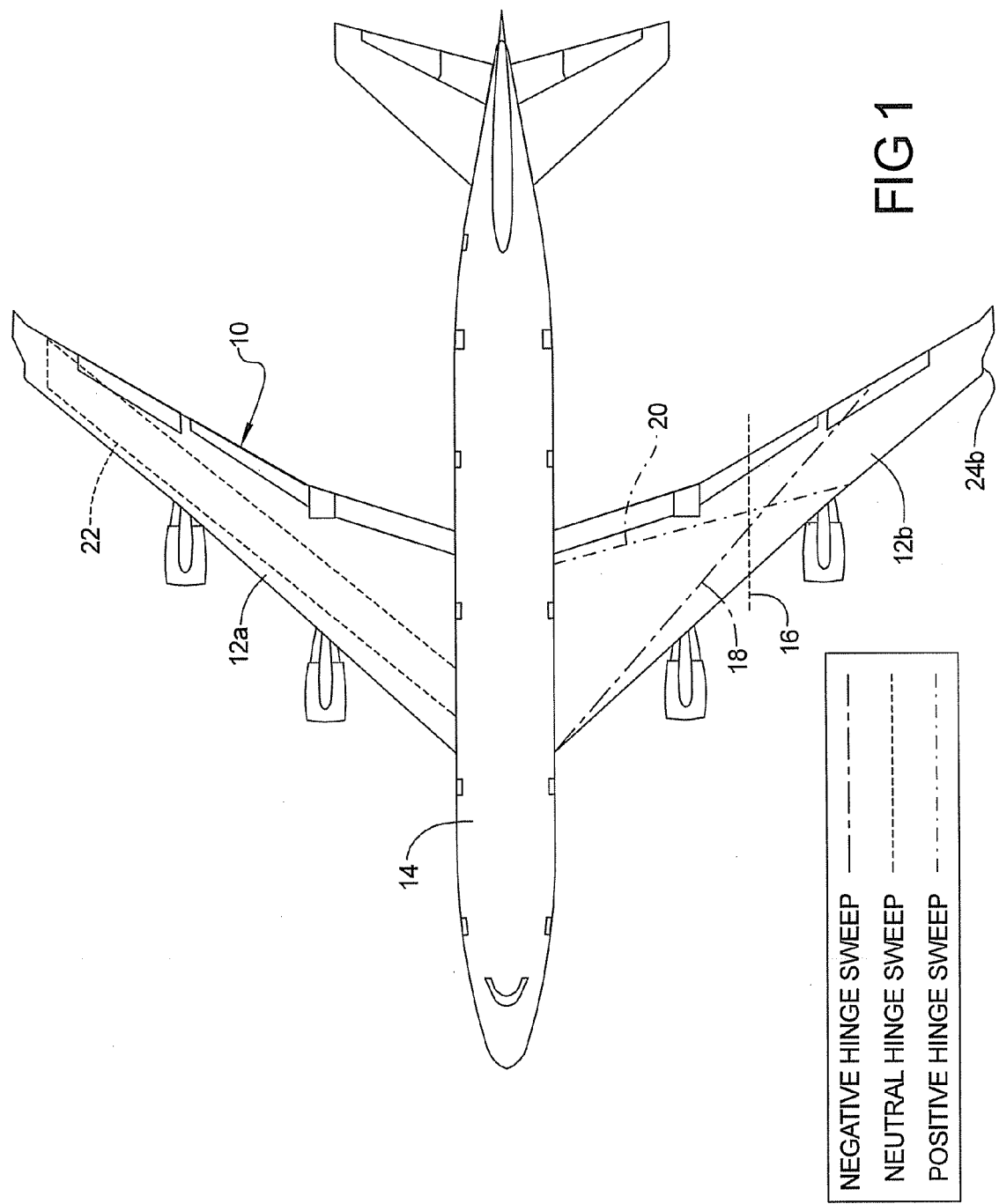
FIG. 1 is a perspective view of an aircraft with neutral, positive and negative hinge lines illustrated by dashed lines on one of the wings, and an apparatus for twisting the wing illustrated by dashed lines on the other wing.

Referring to FIG. 1, there is shown an exemplary airborne mobile platform, in this example an aircraft 10, including a pair of wings 12a and 12b, and a body or fuselage portion 14. While an aircraft is illustrated, it will be appreciated that the present disclosure is applicable to any airborne mobile platform, manned or unmanned, that makes use of wings to control its flight.

Wing 12b of the aircraft 10 includes a dashed line 16 that illustrates a "neutral" sweep hinge line. The neutral sweep hinge line can be viewed as representing the natural bending line of the wing as the wing experiences aerodynamic forces during flight. Dashed line 18 represents a "pseudo" wing hinge orientated to provide a negative sweep hinge line. Dashed line 20 represents another pseudo hinge line that is orientated to provide a positive sweep hinge line. Wing 12a is illustrated with a structural component or assembly 22 represented by dashed lines disposed inside the wing. It will be appreciated, however, that wing 12b similarly includes structural component 22, but the dashed lines indicating its presence have been deleted for clarity. Thus, each of the wings 12a and 12b include structural component 22, and each are preferably independently controlled by a suitable flight control computer or other subsystem carried on the aircraft 10. Each wing (12a and 12b) includes hinge sweeps 16, 18 and 20 as well.

In brief, the structural components 22 in the wings 12a and 12b serve to modify the orientation of the hinge line in each wing to provide either a negative hinge sweep, as indicated by dashed line 18, or a positive hinge sweep, as indicated by dashed line 20, or possibly any intermediate degree of hinge sweep between hinge lines 18 and 20. Controlling the orientation of the hinge line in each wing 12a and 12b allows the natural aerodynamic forces experienced by the wings during flight to assist in twisting the wings as needed to achieve the desired flight control characteristics. For example, during landing operations, a negative hinge sweep is desirable, while at cruise altitudes a neutral hinge sweep is most desirable. A particular advantage of the system and method described herein is that since the natural aerodynamic forces experienced by the wings provide a significant degree of the force needed to twist the wings 12a, 12b, that heavy, large and expensive motors and other like devices, that would otherwise be needed to twist the wings, are not needed with the present system and method.

Figure 2:
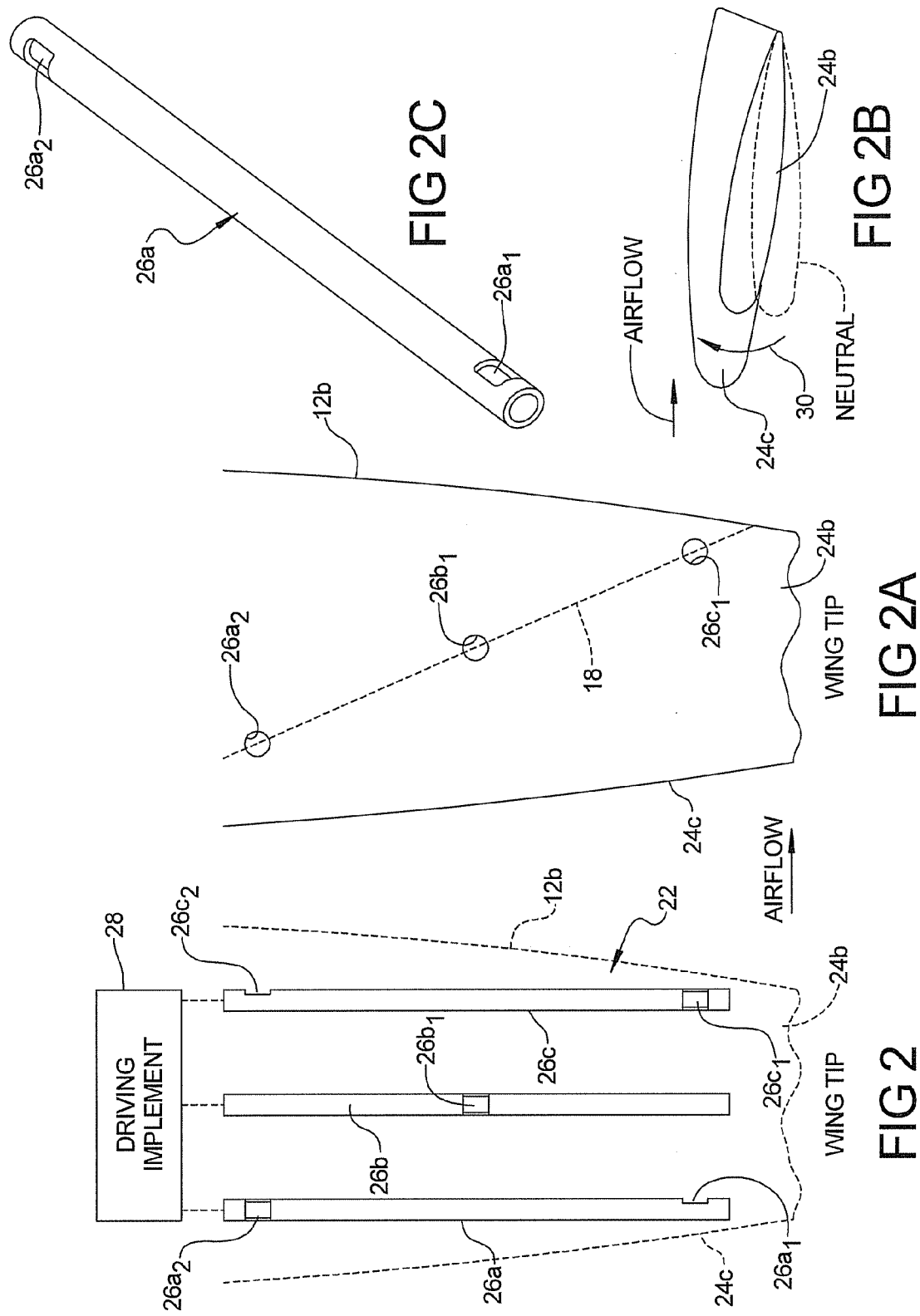
FIG. 2 is a simplified diagrammatic view of one of the wings shown in FIG. 1, with the wing shown in phantom, and illustrating a plurality of structural components within the wing for controllably forming the hinge line along the wing.

Referring to FIGS. 2-2C, one embodiment of the structural component 22 is illustrated in wing 12b. The structural component 22, in this embodiment, includes three independent, elongated tubes 26a, 26b and 26c. The tubes 26 may be formed from aluminum, from composites, or any other suitable material. Tubes 26a and 26c are each coupled at an end near a root of the wing 12b to a driving implement 28. Driving implement 28 may comprise an electric motor, an hydraulic actuator, or any other suitable form of implement for rotating the tubes 26a and 26c. Tube 26a can be seen to have a first cutout $26a_1$ near a tip of the wing 12b, and a second cutout $26a_2$ near the root of the wing. In this embodiment the center tube 26b includes only a single cutout $26b_1$ and is not coupled to the driving implement 28. Tube 26c, however, includes a pair of cutouts $26c_1$ and $26c_2$. Tube 26a is also illustrated in FIG. 2C. It will be noted that cutouts $26a_1$ and $26a_2$ are angularly displaced from one another by about 90°. The same is true for cutouts $26c_1$, $26c_2$ in tube 26c.

Referring to FIG. 2A, when the tubes 26a, 26b and 26c are orientated as illustrated in FIG. 2, the hinge line formed has a negative sweep, as shown in FIG. 2A. During flight, the natural aerodynamic bending force on the wing 12b, with the hinge line 18 as orientated as shown in FIG. 2A, will cause the leading edge 24c of the wing 12b to twist upwardly, as shown in FIG. 2B. The degree of twisting is at a maximum at the wing tip 24b.

Figure 3:
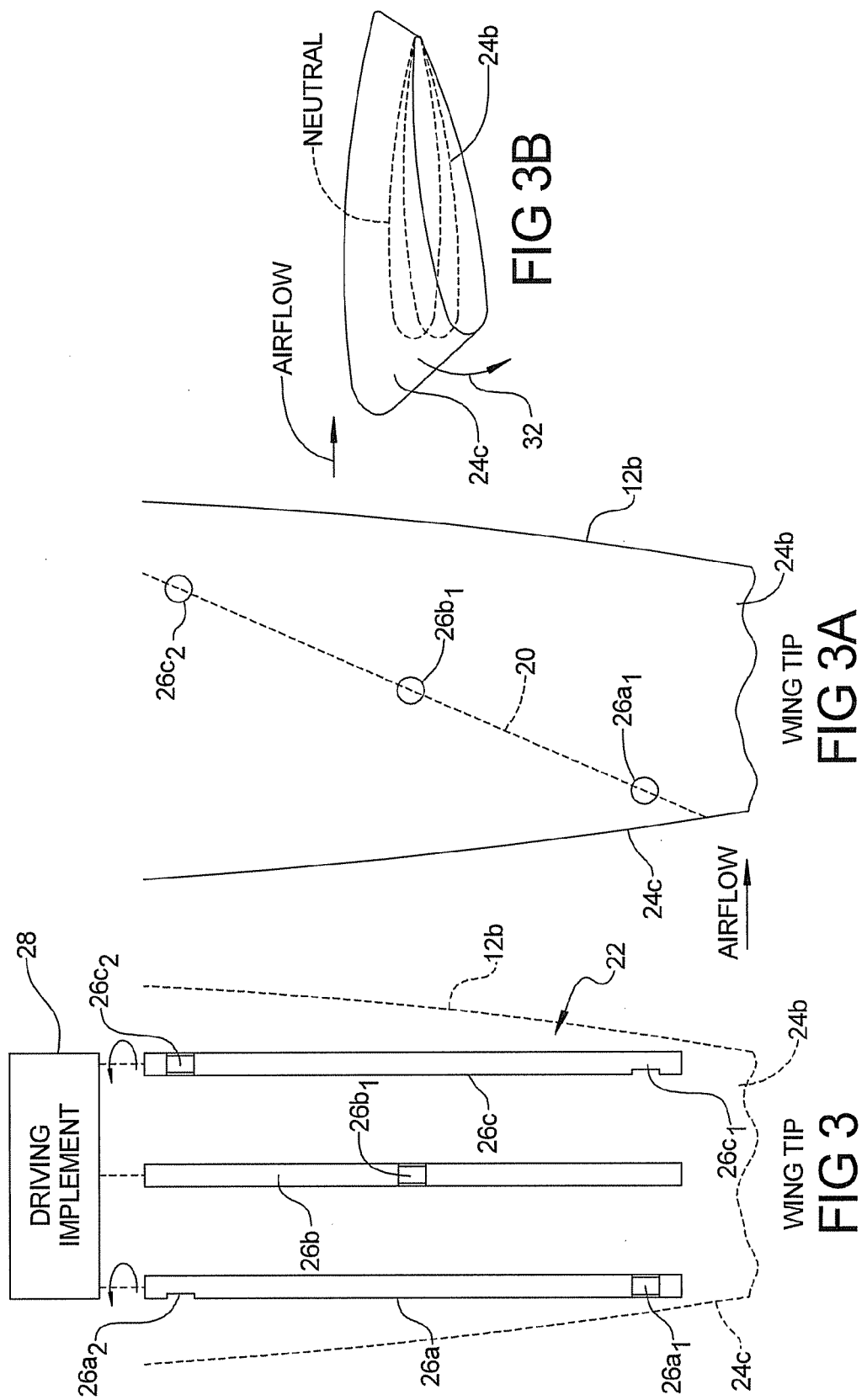
FIG. 3 is a simplified diagrammatic plan view of the wing of FIG. 2 but with the structural components having been rotated 90 degrees.

To change the sweep of the hinge line, the driving implement 28 is used to rotate the tubes 26a and 26c approximately 90°. This places the cutouts $26a_1$ and $26c_2$ in upright facing orientations which changes the positions of localized hinge areas in the tubes 26a and 26c. With tubes 26a-26c positioned as shown in FIG. 3, the hinge line produced has a positive sweep, as illustrated in FIG. 3A. This enables the tip 24b of the wing 12b to be twisted by aerodynamic forces being experienced by the wing 12b such that the tip 24b (as well as the leading edge 24c) is twisted downwardly in accordance with arrow 32 in FIG. 3B. Thus, by simply rotating each of the tubes 26a and 26c by 90°, the hinge line on the wing 12b can be significantly and controllably changed. The natural aerodynamic forces acting on the wing 12b contribute significantly to twisting of the wing tip 24b.

It will be appreciated that while only two cutouts have been illustrated in each of the tubes 26a and 26c, that more or less than two cutouts could be employed. Additionally, the dimensions and shape of each cutout could be altered to tailor the localized hinge areas in each tube 26 as needed to form the desired hinge line or hinge lines. A greater or lesser number of tubes 26 could be employed to suit the needs of specific applications, and the lengths of the tubes 26 can be tailored to the length and shape of the wing 12b.

Figure 4:
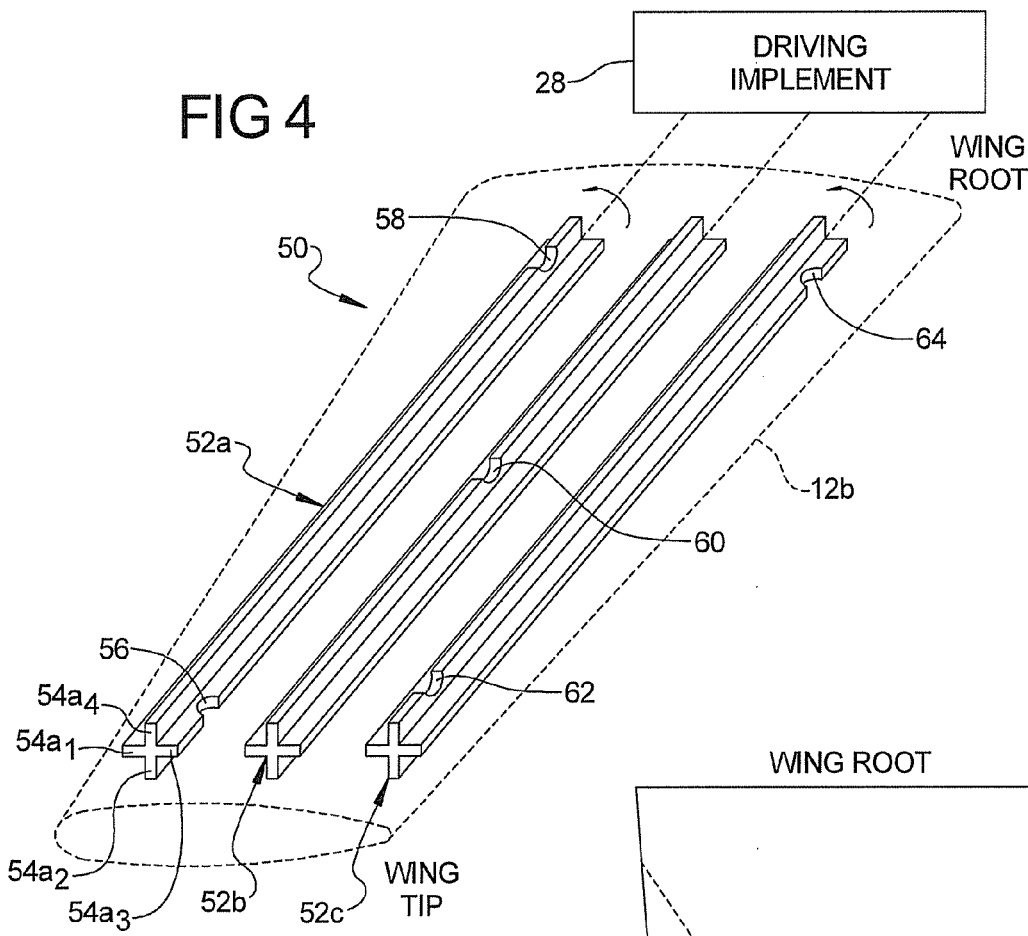
FIG. 4 is a simplified, diagrammatic perspective view of a wing shown in phantom, with internally mounted structural components, in which the structural components each have a cruciform shape when viewed cord-wise, with cutout sections selectively arranged along various panels of each of the cruciform shaped structural components.
Figure 4A:
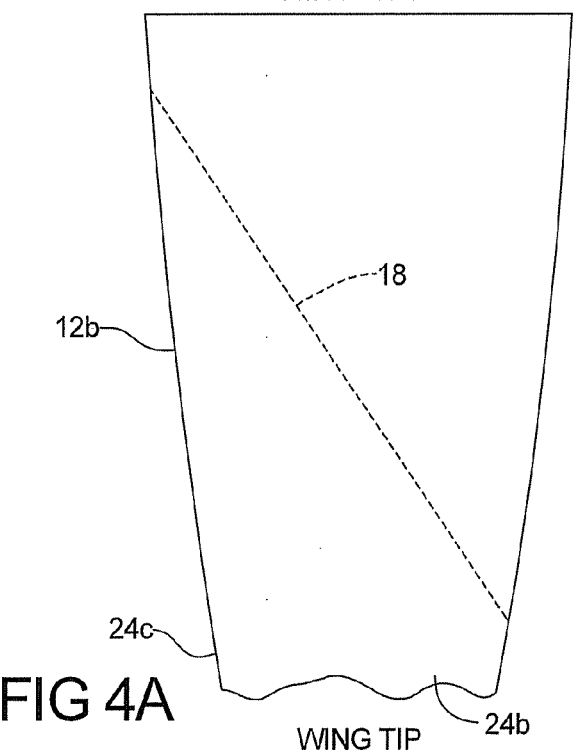
FIG. 4A is a plan view of the wing of FIG. 4 illustrating the orientation of the hinge line formed when the cutouts are disposed as illustrated in FIG. 4.
Figure 5:
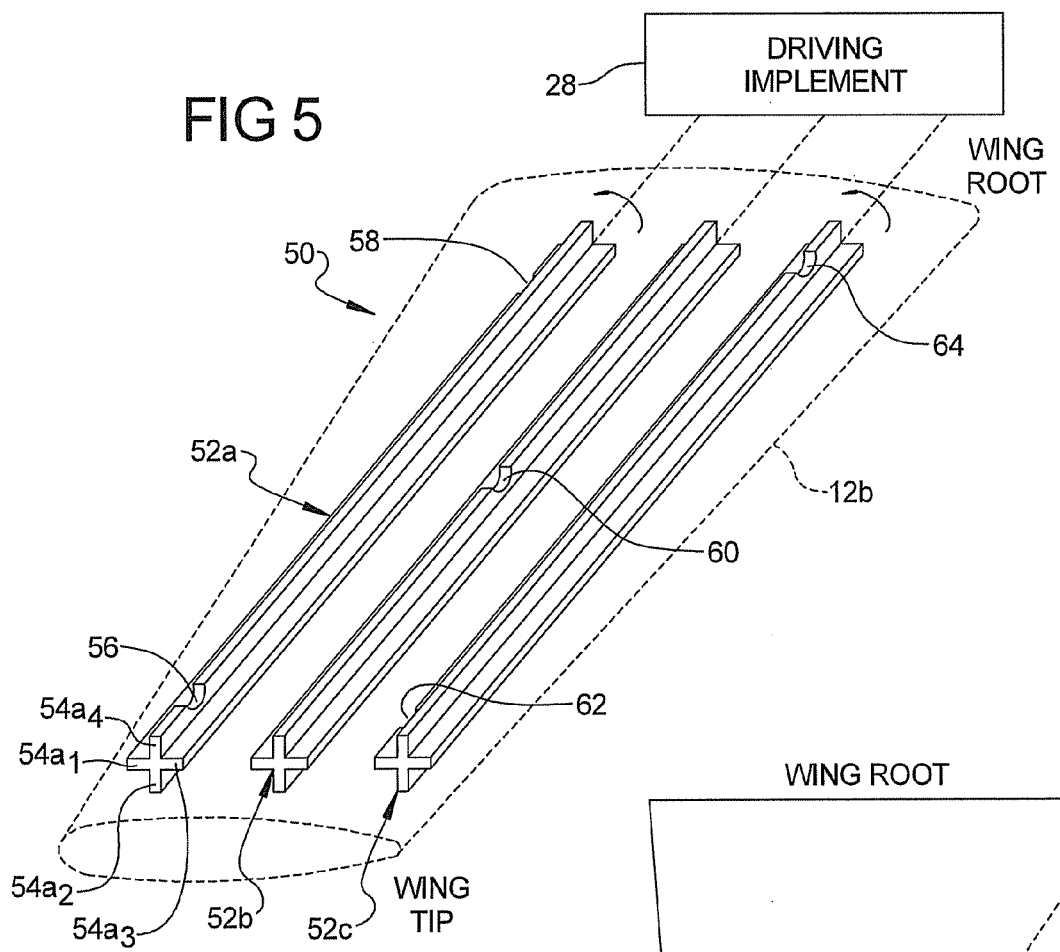
FIG. 5 is a simplified, diagrammatic perspective view of the wing of FIG. 4, but with the structural components having been rotated 90°.
Figure 5A:
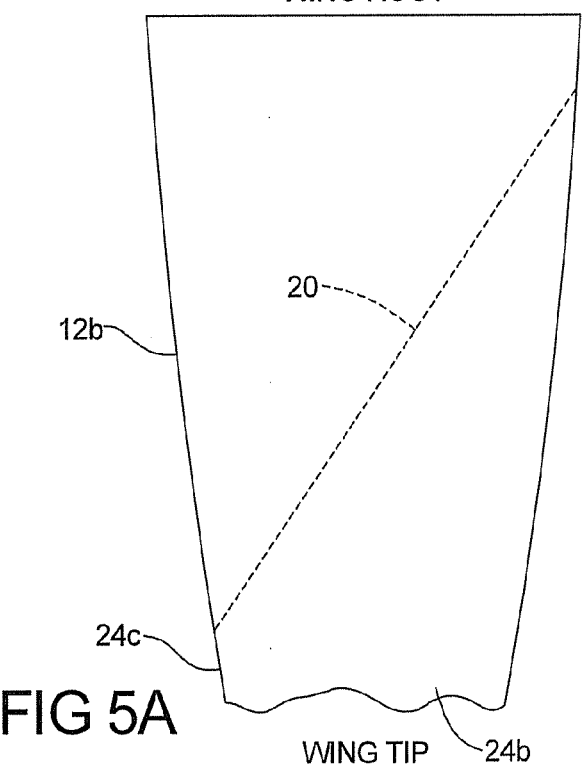
FIG. 5A is a plan view of the wing of FIG. 5 illustrating the orientation of the hinge line formed by the positioning of the cutouts in the cruciform shaped structural components of FIG. 5.

Referring to FIG. 4, an elongated structural component 50 in accordance with an alternative embodiment of the present system and method is illustrated. The structural component 50 includes a plurality of elongated structural members 52a, 52b and 52c. Each of the structural members 52a-52c includes generally perpendicularly extending panels or walls $54a_1$-$54a_4$. Panel $54a_3$ has a cutout 56 while panel $54a_4$ has a cutout 58 arranged approximately 90 degrees from cutout 56. Structural member 52b includes only a single cutout 60, while structural member 52c includes cutouts 62 and 64 disposed angularly about 90° from one another and at opposite ends thereof. Each of the cutouts 56-64 form a localized hinge area in their respective structural members 52a, 52b and 52c. When the cutouts 56-64 are arranged as shown in FIG. 4A, then negative sweep hinge line 18 is formed on the wing 12b, as shown in FIG. 4A. When the driving implement 28 is used to rotate the structural members 52a and 52c approximately 90°, such that cutouts 56 and 64 are facing upwardly, as shown in FIG. 5, then the positive sweep hinge line 20 is produced as shown in FIG. 5A. Again, the number and precise location of each of the cutouts used on the structural members 52a, 52b and 52c can be varied to control the localized hinge areas in the wing 12b to produce a hinge line having a desired orientation on the wing 12b. The structural members 52a, 52b and 52c could be formed from aluminum, from composites, or any other suitably strong, lightweight material.

Referring to FIGS. 6 and 6A, still another structural component 70 representing another alternative embodiment of the present system and method is illustrated. Structural component 70 comprises a plurality of sleeved structural members 72a, 72b and 72c that may be of identical construction. A portion of member 72a is shown in FIG. 6A. In FIG. 6A, member 72a can be seen to include an outer tubular member 74 and an inner tubular member 76 having a plurality of opposing cutout portions 78 and 80. Thus, when portion 74 is slid relative to portion 76, the cutout areas 78 and 80 form a localized hinge area in the overall support member 72a. Preferably, portion 74 has a wall thickness which is substantially less than the wall thickness of portion 76, so that the majority of stiffness of each structural member 72 is significantly influenced by the position of its associated inner tubular member 76. Thus, by controllably positioning the outer tubular member 74 relative to inner tubular member 76, one can change the longitudinal hinge point in the support member 72a.

With further reference to FIG. 6, each of the sleeved support members 72a can be controlled by the driving implement 28 such that the inner member 76 associated with each is longitudinally moved to a desired position to produce a localized hinge line in the wing 12b. The positions of the inner members 76 can thus be aligned to produce a hinge line having a negative sweep, a positive sweep, or virtually any intermediate sweep angle that may be desired.

In FIG. 7, an alternative structural component 90 is illustrated. Structural component 90 forms a tube having a spiral cutout 92 extending over an angular orientation of about 90°. By rotating the tube 90, the precise location of the hinge area that it forms can be infinitely adjusted along the 90° arc defined by the spiral cut-out 92. For example, in the drawing of FIG. 7, rotating the structural component 90 counterclockwise according to arc line 94 will cause the localized hinge area to move in the direction of arrow 96. Rotating the structural component 90 clockwise would cause the localized hinge area to move in a direction opposite to line 96.

From the foregoing, the various embodiments of the structural component, taken together with the driving implement, can be used to create localized hinge areas in the wing that form a hinge line having a desired sweep. It is a particular advantage of the present system that the natural aerodynamic forces acting on the wings 12a, 12b can be used to twist the tips of the wings 12a, 12b. Controlling the sweep of the hinge line on each wing 12a, 12b can contribute to producing highly maneuverable aircraft. The ability to controllably change the hinge line on each wing, using the natural aerodynamic forces experienced by the wing, rather than large, expensive and heavy motors or actuators, further enables the present system to be implemented on smaller, lighter aircraft where conventional wing twisting systems might not be possible, practical or cost effective.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An airborne mobile platform comprising:
  a wing having a length and a chord wise dimension;
  a plurality of elongated structural components each extending span-wise along said length of said wing, the elongated structural components each having a localized hinge area; and
  a device for manipulating said elongated structural components to position said localized hinge area to selectively change a hinge line of the wing in response to an airflow over the wing.

2. The airborne mobile platform of claim 1, wherein the positioning of the localized hinge area enables the hinge line of the wing to be changed between a predetermined first and second orientations.

3. The airborne mobile platform of claim 1, wherein positioning of the localized hinge area enables the hinge line to be changed to first and second orientations, and a plurality of additional orientations intermediate to said first and second orientations.

4. The airborne mobile platform of claim 1, wherein said device for positioning said localized hinge area rotates said elongated structural components to enable said localized hinge area to alter said hinge line of said wing between an infinite number of incrementally different positions.

5. The airborne mobile platform of claim 1, wherein each said elongated structural component comprises a tubular member having a cut-out area, the structural component being rotatable to selectively angularly orientate said localized hinge area.

6. The airborne mobile platform of claim 1, wherein each said elongated structural component comprises a sleeved assembly comprising first and second members, with said first member including the localized hinge area and being longitudinally moveable relative to the second member.

7. The airborne mobile platform of claim 1, wherein each of the elongated structural components comprises a rotatable assembly having a cruciform shaped structural element having a plurality of perpendicularly extending panels, with selective ones of said panels each having cut-out sections to help form said localized hinge area.

8. The airborne mobile platform of claim 1, wherein each said structural component comprises a spiral cutout to form said localized hinge area.

9. A wing comprising:
  a plurality of elongated structural components each extending span-wise along said wing;
  each said elongated structural component having a localized hinge area;
  a subsystem for manipulating each said elongated structural component to selectively position said localized hinge area to controllably position a hinge line of said wing, and without imparting a twisting force to the wing.

10. The wing of claim 9, wherein positioning of the localized hinge area enables the hinge line to be changed to a first and a second orientation, and a plurality of additional orientations intermediate said first and second orientations.

11. The wing of claim 9, wherein each of the elongated structural components comprises a tubular member having a spiral groove cut-out formed therein that forms said localized hinge area.

12. The wing of claim 11, wherein rotation of each said elongated structural component causes a change in span-wise positioning of said localized hinge area, to enable said positioning of said hinge line.

13. The wing of claim 11, wherein the spiral groove cut-out extends over an angular orientation of about 90 degrees.

14. The wing of claim 9, wherein each of the elongated structural support components comprises a sleeved assembly having first and second members, with said first member including said localized hinge area.

15. The wing of claim 9, wherein each of the elongated structural components comprises at least one elongated member having a chord-wise cruciform shape, formed by a plurality of panels, with selected ones of said panels having localized hinge areas formed therein.

16. A method for controllably positioning a hinge line on a wing of a mobile platform, the method comprising:

providing a plurality of structural component components each extending span-wise within said wing;

forming a localized hinge area in each said structural component; and controllably positioning said structural components to control a position of said localized hinge area within said wing, to controllably vary the position of a hinge line of said wing.

17. The method of claim 16, wherein forming said localized hinge area comprises forming cut-outs in each of said structural components, and forming each said structural component with a chord-wise cruciform shape.

18. The method of claim 16, wherein forming said localized hinge area comprises forming a cut-out area on each said structural component, and forming each said structural component as a tubular structural component.

19. The method of claim 16, wherein forming said localized hinge area comprises forming a spiral cut-out in each said structural component, and forming each said structural component as a tubular structural component.

20. The method of claim 16, wherein providing a plurality of structural components comprises forming a plurality of sleeved structural assemblies each having first and second members, with at least one of said first and second members having formed therein said localized hinge area.

* * * * *

UNITED STATES PATENT AND TRADEMARK OFFICE
CERTIFICATE OF CORRECTION

PATENT NO.         : 7,637,454 B2                                      Page 1 of 1
APPLICATION NO. : 11/447760
DATED              : December 29, 2009
INVENTOR(S)        : Dale M Pitt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 524 days.

Signed and Sealed this

Ninth Day of November, 2010

David J. Kappos
*Director of the United States Patent and Trademark Office*